Figure 1:
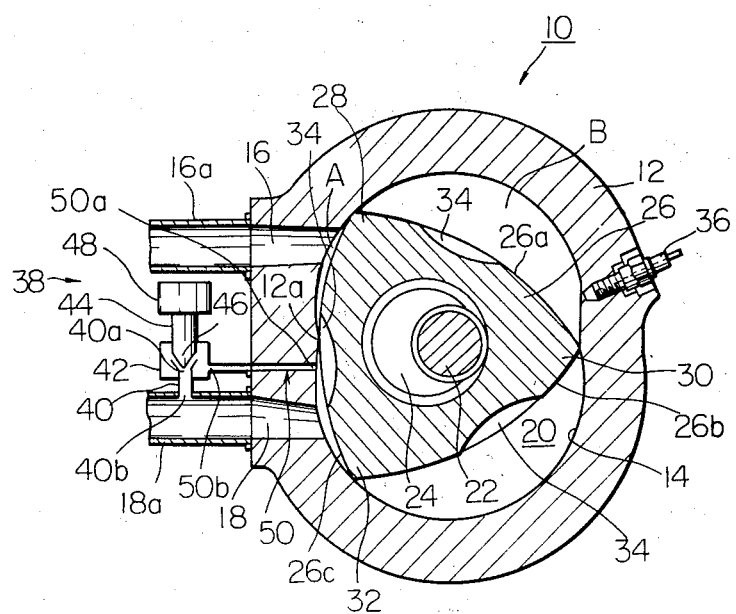

United States Patent [19]

Sawada

[11] 3,777,721
[45] Dec. 11, 1973

[54] ROTARY INTERNAL COMBUSTION ENGINE OF THE TROCHOIDAL TYPE

[75] Inventor: Hiraki Sawada, Nerima-ku, Tokyo, Japan

[73] Assignee: Nissan Motor Company, Limited, Yokohama City, Japan

[22] Filed: Aug. 3, 1972

[21] Appl. No.: 277,533

[30] Foreign Application Priority Data
Aug. 19, 1971   Japan.............................. 46/63261

[52] U.S. Cl...................... 123/8.45, 60/316, 60/901
[51] Int. Cl............................................ F02b 53/04
[58] Field of Search....................... 123/8.01, 8.45; 60/900, 901, 273, 274, 307, 315, 316

[56] References Cited
UNITED STATES PATENTS
3,531,932   10/1970   Froede........................... 123/8.45 X
3,647,327   3/1972   Manthey............................. 418/61

Primary Examiner—Carlton R. Croyle
Assistant Examiner—Michael Koczo, Jr.
Attorney—John Lezdey et al.

[57] ABSTRACT

A rotary internal combustion engine of the trochoidal type having a trigonal rotor rotatable relative to the housing on an eccentric of a main shaft, the main shaft being supported by the lateral housing parts and the housing being provided with an inlet port and an outlet port connected to an exhaust pipe opened and closed by the apex portions of the trigonal rotor, and which includes an auxiliary exhaust gas passageway provided at the end portion of a trochoidal quarter of the housing adjacent the exhaust port and communicating with the exhaust pipe to cause the engine exhaust gases remaining in the trailing portion of the combustion chamber to be delivered to the exhaust pipe, and an air ejecting means cooperating with the auxiliary exhaust gas passageway for satisfactorily directing the exhaust gases otherwise leaking into the suction chamber into the exhaust port, the air ejecting means introducing secondary air into the exhaust pipe downstream of the exhaust port to effect satisfactory combustion of the still not unburned components contained in the engine exhaust gases.

5 Claims, 2 Drawing Figures

ROTARY INTERNAL COMBUSTION ENGINE OF THE TROCHOIDAL TYPE

This invention relates to rotary internal combustion engines of the trochoidal type and, more particularly, to a rotary internal combustion engine having a housing consisting of a housing case and of lateral walls, a trigonal rotor in the housing which is eccentrically rotatably arranged on a shaft supported by the lateral housing walls so as to eccentrically rotate relative to the housing and to the eccentric shaft, and provided with an inlet port and an outlet port which are opened and closed by the piston.

In the operation of internal combustion engines of this type, it has been found that during rotation of the polygonal piston, overlapping takes place in which the inlet port communicates with the outlet port due to its inherent construction. In this condition, the exhaust gases are sucked into the suction chamber and mixed with a fuel mixture in the suction chamber thereby causing incomplete combustion of the fuel mixture so that not only the performance efficiency of the engine is decreased but also a high amount of unburned fuel mixtures are emitted to the atmosphere polluting the air seriously.

It is, therefore, an object of the present invention to provide an improved rotary internal combustion engine of the type described hereinabove which obviates by simple means the shortcomings encountered in the prior art contruction.

Another object of the present invention is to provide an improved rotary internal combustion engine by which a highly improved combustion efficiency is obtained.

A still another object of the present invention is to provide an improved rotary internal combustion engine which is adapted to reduce the amounts of unburned noxious and harmful component elements contained in exhaust gases emitted from the internal combustion engine.

A further object of the present invention is to provide an improved rotary internal combustion engine which is provided with means for introducing secondary air into the outlet port of the internal combustion engine to effect satisfactory combustion of the unburned component elements contained in engine exhaust gases.

A still further object of the present invention is to provide an improved rotary combustion engine which is provided with means for preventing the engine exhaust gases from being sucked into the suction chamber of the internal combustion engine without loss in engine output or sacrificing to the performance efficiency thereof.

A still further object of the present invention is to provide a rotary internal combustion engine of the trochoidal type which is simple in construction and economical to manufacture.

In order to achieve these objects, the present invention proposes to provide a rotary internal combustion engine of the trochoidal type having a housing provided with a trochoidal inner surface, an inlet port and an outlet port. A trigonal rotor is operatively disposed in a cavity of the housing and is eccentrically rotatable on a main shaft extending through the housing. The rotary internal combustion engine also has an air ejecting means which is adapted to eject secondary air into an exhaust pipe connected to the exhaust port to satisfactorily effect combustion of the still not unburned components in engine exhaust gases. The air ejecting means is provided with a vacuum chamber in which vacuum is created by the stream of secondary air passing through a nozzle of the air ejecting means. An auxiliary exhaust gas passageway is associated with the air ejecting means so that the vacuum created thereby is effectively utilized to prevent the engine exhaust gases from being sucked into the suction chamber. The auxiliary exhaust gas passageway has an inlet provided at the end portion of a trochoidal quarter of the housing adjacent the exhaust port and an outlet communicating with the vacuum chamber.

Figure 2:
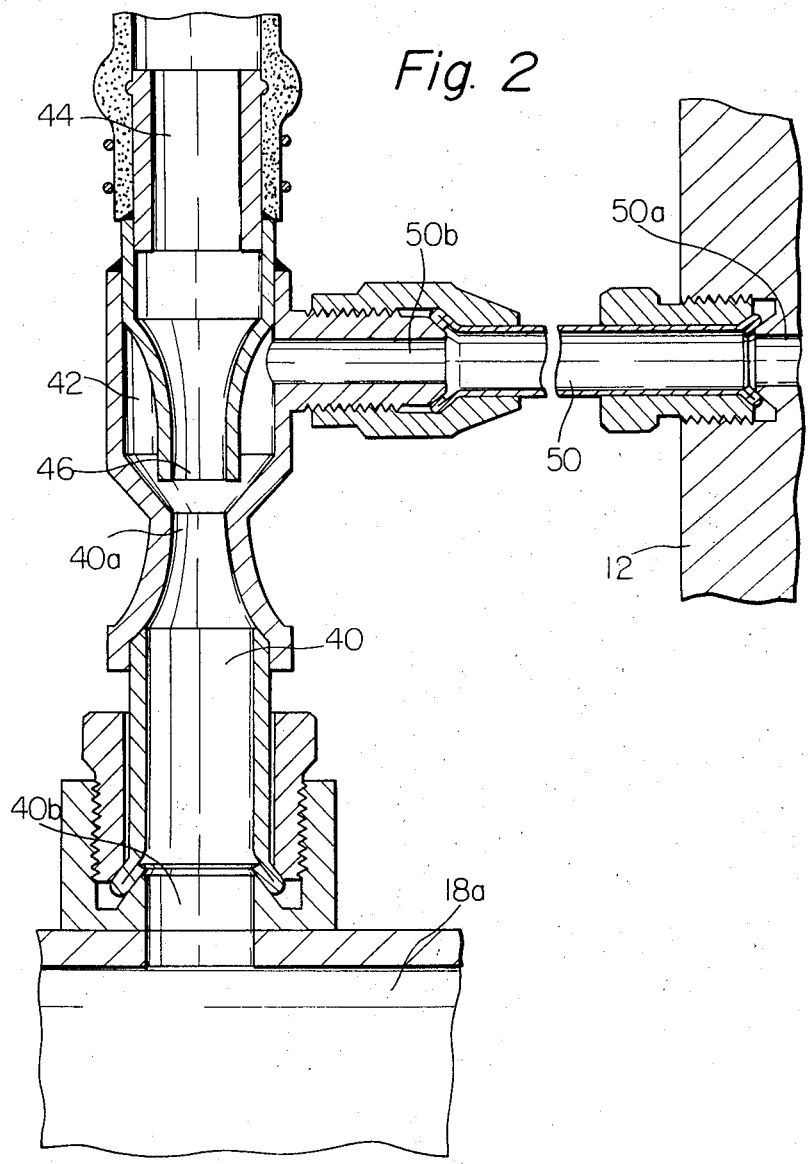

In the accompanying drawings:

FIG. 1 is a schematic sectional view of a preferred embodiment of a rotary internal combustion engine in accordance with the present invention; and FIG. 2 is a cross sectional view illustrating a detail construction of the air ejecting means shown in FIG. 1.

Referring now to FIG. 1, there is shown in section a rotary internal combustion engine of the trochoidal type implementing the present invention, the internal combustion engine being generally designated by reference numeral 10. The internal combustion engine 10 is shown to include a housing 12 having a two-lobed trochoidal inner surface 14, an inlet port 16 and an outlet or exhaust port 18. As shown, the inlet port 16 is connected to an inlet pipe 16a and the exhaust port 18 is connected to an exhaust pipe 18a. Lateral walls 20 (only one of which is shown in FIG. 1) are provided to complete the housing. A main shaft 22 extends between and through the end walls 20 and carries or eccentrically rotatable rotor by an eccentric portion 24 on which is rotatably mounted the generally trigonal rotor 26 having three apex portions 28, 30 and 32 with convexly arcuate working surfaces 26a, 26b and 26c extending between adjacent apex portions. A trough-like cutout or recess 34 is provided in each arcuate working face to transfer gases across a cusp 12a of the trochoid. It should be noted that an apex seal member to be mounted in a groove at each apex of the rotor is herein omitted for the sake of simplicity of illustration. Indicated at 36 is a spark plug which ignites the air-fuel mixture supplied into the housing casing 12.

In FIG. 1, reference character A represents a suction chamber and reference character B represents a compression chamber.

As previously noted, the inlet port 16 communicates with the exhaust port 18 during rotation of the trigonal rotor 26 especially when the rotor assumes a position as shown in FIG. 1. Under this circumstance, some exhaust gases in the exhaust port 18 are sucked into the suction chamber A and are mixed with the air fuel mixture in the suction chamber A. This is reflected by an incomplete combustion of the air-fuel mixture with a result that the engine output is decreased and unburned noxious and harmful components are emitted to the atmosphere thereby seriously polluting the air especially in urban areas.

In order to solve this problem, the present invention contemplates to blow secondary air into the exhaust pipe downstream of the exhaust port to effect complete combustion of the still not unburned components contained in the exhaust gases therein while preventing the exhaust gases from being sucked into the suction chamber. To this end, an air ejecting means 38 is provided which is adapted to eject secondary air into the exhaust pipe 18a downstream of the exhaust port 18. As best seen in FIG. 2 the air ejecting means 38 comprises a conduit 40 having an inlet 40a opening into a vacuum chamber 42 and an outlet 40b communicating with the exhaust pipe 18a downstream of the exhaust port 18, an ejecting pipe 44 having a nozzle 46 disposed in a position adjacent the inlet 40a of the conduit 40, and an air compressor 48 communicating with the ejecting pipe 44 and adapted to supply secondary air under pressure thereinto. According to an important feature of the present invention, an auxiliary passageway 50 is associated with the air ejecting means 38 for a reason to be described in detail. The auxiliary passageway 50 has an inlet 50a provided at the end portion of a trochoidal quarter (not identified) of the housing casing 12 adjacent the exhaust port 18 and an outlet 50b connected to the vacuum chamber 42. More specifically, the inlet 50a of the auxiliary passageway 50 is arranged to be located between the cusp 12a and the exhaust port 18.

As the rotor 26 rotates clockwise as viewed in FIG. 1, the volume of the suction chamber A reaches a minimum. When the volume of the suction chamber A is minimum, the spark plug 36 fires, initiating the combustion in the chamber A. As combustion continues and the chamber A reaches its may volume, the point is reached where the exhaust port 18 is exposed, and the exhaust gases are expelled from a chamber defined between the inner surface 14 of the housing 12 and the working surface 26c of the rotor 26 to the exhaust pipe 18a, through which the exhaust gases are emitted to the atmosphere. In this instance, secondary air is ejected from the nozzle 46 of the ejector pipe 44 into the conduit 40 through which secondary air is introduced into the exhaust pipe 18a downstream of the exhaust port 18. Consequently, the still not unburned components in the exhaust gases are completely burned with the aid of secondary air introduced into the exhaust pipe 18a. Since, at this instant, vacuum is created in the vacuum chamber 42 by the stream of secondary air passing through the nozzle 46 so that the exhaust gases remaining in the trailing portion of the suction chamber A is sucked into the vacuum chamber 42 through which the exhaust gases are passed into the exhaust pipe 18a with the stream of secondary air.

Thus, the amount of exhaust gases otherwise sucked into the suction chamber A is reduced to provide an improved and efficient combustion, thereby increasing engine performance efficiency and eliminating air pollution.

Although the present invention has been shown and described in connection with one preferred embodiment, it will be apparent to those skilled in the art that various changes and modifications can be made without departing from the spirit and scope of the appended claims.

What is claimed is:

1. A rotary internal combustion engine of the trochoidal type comprising housing means having an inner surface forming a trochoidal chamber, eccentrically rotatable trigonal rotor means disposed within said trochoidal chamber, means for supporting said rotor means for electrical rotary movement within said trochoidal chamber, said housing and said rotor means forming a suction chamber and a combustion chamber therebetween, said housing having an inlet port and an outlet port, an exhaust pipe connected to said outlet port, passage means for passing exhaust gases remaining in the trailing portion of said combustion chamber into said exhaust pipe downstream of said exhaust port, air ejecting means for introducing secondary air into said exhaust pipe downstream of said exhaust port, and means for creating vacuum by said air ejecting means, said vacuum creating means being associated with said passage means, whereby the exhaust gases remaining in the trailing portion of said combustion chamber are sucked through said passage means into said exhaust pipe.

2. A rotary internal combustion engine as claimed in claim 1, wherein said passage means includes an inlet provided at the end portion of a trochoidal quarter of said housing adjacent said exhaust port and an outlet communicating with said exhaust pipe through said air ejecting means.

3. A rotary internal combustion engine as claimed in claim 1, wherein said air ejecting means includes a vacuum chamber communicating with said passage means, conduit means having an inlet communicating with said vacuum chamber and an outlet communicating with said exhaust pipe downstream of said exhaust port, an air ejecting pipe having a nozzle opening into said inlet of said conduit means, and a source of pressurized secondary air for supplying secondary air under pressure into said exhaust pipe through said conduit.

4. In a rotary internal combustion engine of the trochoidal type including a housing having a trochoidal chamber, an inlet port and an outlet port, an exhaust pipe connected to said outlet port, and a trigonal rotor rotatably disposed in said trochoidal chamber of said housing, said housing and said trigonal rotor forming a suction chamber and a combustion chamber therebetween, the improvement comprising means for passing exhaust gases remaining in the trailing part of said combustion chamber to said exhaust pipe and means for aspirating said exhaust gases remaining in said trailing part of said combustion chamber and discharging them into said exhaust pipe downstream of said exhaust port.

5. In a rotary internal combustion engine of the trochoidal type including a housing having a trochoidal chamber, an inlet port and an outlet port, an exhaust pipe connected to said outlet port, and a trigonal rotor rotatably disposed in said trochoidal chamber, said housing and said trigonal rotor forming a suction chamber and a combustion chamber therebetween, the improvement comprising an auxiliary exhaust gas passageway having an inlet and an outlet, said inlet of said auxiliary exhaust gas passageway being provided in said housing between a cusp in the trochoidal chamber and said exhaust port of said housing, and air ejecting means associated with said auxiliary exhaust gas passageway for sucking in exhaust gases remaining in the trailing part of said combustion chamber and discharging them into said exhaust pipe, said air ejecting means including a vacuum chamber communicating with said outlet of said auxiliary exhaust gas passageway, a conduit having an inlet communicating with said vacuum chamber and an outlet communicating with said exhaust pipe downstream of said exhaust port of said housing, an air ejecting pipe having a nozzle opening into said inlet of said conduit, and an air compressor supplying secondary air under pressure into said air ejecting pipe, said nozzle of said air ejecting pipe creating vacuum in said vacuum chamber and said conduit, whereby the exhaust gases remaining in the trailing portion of said combustion chamber are sucked into said vacuum chamber and blown into said exhaust pipe downstream of said exhaust port to prevent the exhaust gases from being sucked into said suction chamber.

* * * * *